No. 794,172. PATENTED JULY 11, 1905.
D. A. FRICK.
NUT LOCK.
APPLICATION FILED APR. 18, 1904.
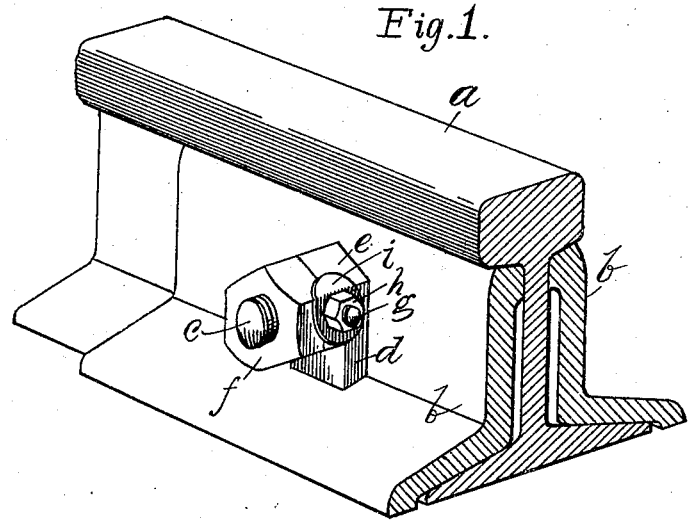
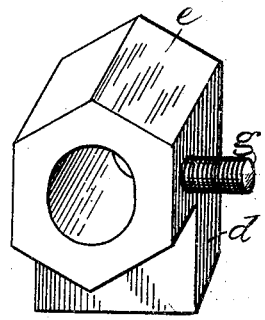 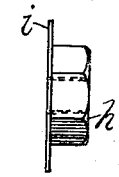
WITNESSES: INVENTOR:
David C. Walter David A. Frick
N. Marles By Simon Hall
His Atty.

No. 794,172.

Patented July 11, 1905.

UNITED STATES PATENT OFFICE.

DAVID A. FRICK, OF OTTAWA, OHIO.

NUT-LOCK.

SPECIFICATION forming part of Letters Patent No. 794,172, dated July 11, 1905.

Application filed April 18, 1904. Serial No. 203,626.

*To all whom it may concern:*

Be it known that I, DAVID A. FRICK, a citizen of the United States, residing at Ottawa, in the county of Putnam and State of Ohio, have invented certain new and useful Improvements in Nut-Locks; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to means for securing in place fish-plates, angle-plates, and the like in railways, and more particularly to means for preventing the bolts and nuts used in such construction from becoming loosened by accident or by the vibration and jar of passing trains.

The object of my invention is to provide a cheap, simple, and highly-efficient lock for the nut employed in this class of construction, which lock may be readily removed and replaced. I attain these objects by means of the devices and arrangement of parts hereinafter described and shown, and illustrated in the accompanying drawings, in which—

Figure 1 is a perspective view of my device in place, showing the rail and angle-plates in place; Fig. 2, a perspective view of my washer, hereinafter referred to, detached; and Fig. 3, an edge elevation of my safety-nut, hereinafter referred to, detached.

Like letters of reference indicate like parts throughout the drawings.

In the drawings, $a$ is a track-rail, and $b\ b$ angle-plates which engage opposite sides of the meeting ends of rails. Through the web of the rail and through the upright portions of the angle-plates are coincident holes, through which passes a headed bolt $c$.

$d$ is a washer having therethrough an opening which permits the washer to be readily slipped over the projecting threaded part of the bolt. The inner side and bottom of the washer are formed to exactly fit into the angle formed by the meeting of the upright and horizontal members of the angle-plate. The top of the washer is beveled, as at $e$, to correspond with the marginal sides of the hexagonal nut $f$. Projecting horizontally from one side of the washer $d$ and formed integral therewith is a cylindrical lug $g$, threaded to receive nut $h$. This nut has a broad thin flange $i$.

The operation of my device is as follows: The rail, angle-plates, and bolt being assembled as illustrated in Fig. 1, the washer is slipped into place upon the threaded extremity of the bolt, with its inner side and beveled bottom resting against the corresponding members of the angle-plate. The nut $f$ is tightly screwed home against the washer. The nut $h$ is screwed tightly upon the threaded lug $g$, with the flange $i$ foremost. The flange $i$ by a blow with a hammer or wrench is bent inwardly, so that it overlaps and rests upon the nut $f$ and the top of the washer $e$. It will be seen that now the nut $h$ is held against turning by means of its bent flange and that the nut $f$, being also engaged by the flange $i$ and the nut $h$, is prevented from turning or becoming loosened. When it is necessary to remove the nut $f$, the safety-nut $h$ may be unscrewed and the flange $i$ straightened out by means of a stout wrench powerfully applied.

Having described my invention, what I claim, and desire to secure by Letters Patent, is—

1. A nut-lock comprising a washer having its inner and bottom sides adapted to fit in the angle of an angle-plate and having a top beveled to conform to one of the sides of a polygonal nut, a radially-projecting threaded lug upon said washer, a polygonal nut, and a safety-nut adapted to take said threaded lug and having a flange adapted to be bent into engagement with said washer and with said polygonal nut.

2. In a nut-lock, a washer, a radial threaded lug on the washer, a nut for the lug and a pliant flange upon the nut.

In testimony whereof I affix my signature in presence of two witnesses.

DAVID A. FRICK.

Witnesses:
GEORGE FRITZ,
W. W. SUTTON.